Sept. 22, 1931.  G. E. BOVINGDON  1,824,193
SLIDING SEAT FOR MOTOR CARS AND THE LIKE
Filed March 8, 1930
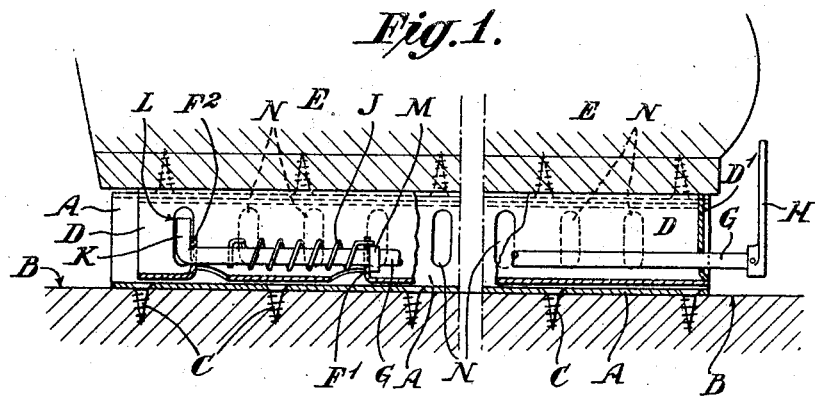
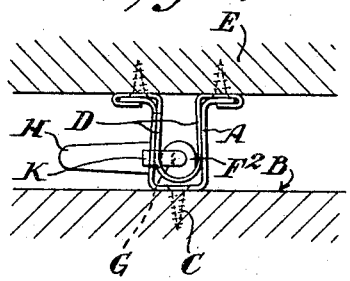
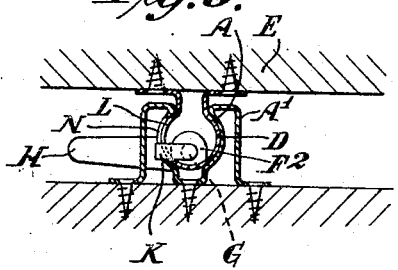
INVENTOR
GEORGE E. BOVINGDON Patented Sept. 22, 1931

1,824,193

UNITED STATES PATENT OFFICE

GEORGE EDWARD BOVINGDON, OF HAMPSTEAD, ENGLAND

SLIDING SEAT FOR MOTOR CARS AND THE LIKE

Application filed March 8, 1930, Serial No. 434,327, and in Great Britain March 12, 1929.

This invention relates to means for locking the slidable seats of motor cars and the like in a forward or backward or an intermediary position, said means comprising fixed and movable members on floor and seat respectively which slidably interengage one within the other and carry spring-controlled locking means releasable by a hand-operated lever, thereby ensuring perfect alignment, rigidity and security of the members in relation to one another.

The present invention provides a locking means comprising slidably interengaging fixed and movable members, wherein a longitudinally disposed spring-controlled handled bolt or bar is carried by and within the movable member and is adapted by its cranked inner end to project sidewardly through a slot in the wall of the movable member into engagement with the one or the other of a series of slots in the wall of the fixed member.

For a ready understanding of the invention, reference is directed to the accompanying sheet of drawings, wherein:—

Figure 1 is a longitudinal sectional view illustrative of a practical embodiment of the invention, locking device being shown released.

Figure 2 is a rear end view thereof, showing the members locked together.

Figure 3 is a transverse sectional view illustrative of a modified embodiment of the invention, showing the members locked together.

In carrying out the invention and referring to Figures 1 and 2, the female or stationary section is constituted by a more or less U-shaped and open-ended tube A, secured to the floor B of the car, by screws C.

The male member or movable section D is constituted by a substantially U-shaped tube with closed-in front end D¹, said male section being fixedly secured to and horizontally depending from the base of the seat board or bottom of the seat E.

Rotatably mounted in the front closed end of the tube of the slidable section, and also in conveniently spaced-apart inwardly disposed lugs F¹, F² stamped out from the wall of said tube D, is a longitudinally disposed locking bar G which extends beyond the front closed end of the tube D, and is fitted with an operating lever or handle H.

Between the inwardly disposed lugs F¹, F² and encircling the locking bar G aforesaid is a coil tension spring J, which by one end is anchored to the forward lug F¹ and by its other end to said locking bar G.

The locking bar G at its rear end is formed with an extension or locking arm K bent at right angles to said locking bar G, said locking arm K, under the action of the spring J, normally extending through a slot L in the wall of the tube D and bearing against the rear lug F² therein, a collar M fixedly secured to the locking bar G and bearing against the forward face of the front lug F¹, preventing, in conjunction with the rear lug F², any longitudinal movement of the aforesaid locking bar G.

Further, in the wall of the tubular portion of the stationary section A of the fitting, a number of equally spaced-apart vertically disposed slots N are provided.

To fit the sections A and B together, the hand lever H of the movable or slidable section D is operated against the action of the spring J to turn the locking bar G so that the locking arm K is moved through a right angle, and thereby bring said locking arm K out of the slot L in the tube of said slidable section D into the tube interior.

The tube portion of the slidable section D is then inserted through the front open end of the tubular portion of the stationary section A into said tubular portion and slid along inside the same to a position such that the slot L in the tube of the slidable section D aligns with the one or the other of the slots N in the tube of the stationary section A.

In this position the hand lever H is released and the locking bar G, under the action of its spring J, turns in an anti-clockwise direction so that the locking arm K of said bar G extends through the aligning slots L and N.

This engagement of the locking arm K with the aligning slots L and N prevents any further movement of the seat E in either a forward or backward direction until desired; that is to say, till the hand lever H is operated to disengage the locking arm K from the aligning slots L and N, to allow of the seat E being slid in either direction to required position and allow of the locking arm K engaging in another slot in the tube of the stationary section A.

In a modified construction, shown in Figure 3, the interengaging male member D and the female member A are substantially of circular cross-section, the male member D being received within a correspondingly shaped portion depending from and forming part of the upper wall of an inverted channel-like member $A^1$ formed in one with the member A and secured to the floor of the car.

With fittings, as above set forth, there quickly obtains security and rigidity in locking the seat in desired position, the minimum of labour is entailed when fitting, and the seat can be placed anywhere in the car without fear of injuring the upholstery or other parts of the car interior.

Further, as the slidable section, and with it the seat, can be readily slid right out of the stationary section, said seat can be used for picnic and like purposes, and, after use, can be readily returned into its proper position on the stationary section.

I claim:—

A device for locking slidable seats of motor cars and the like in an adjusted position comprising a pair of hollow interfitting channel members, one of which is carried by the seat and the other of which is carried by the floor of the vehicle, the adjacent walls of said interfitting channel members being provided with openings, and a locking device carried by the member fitted to the seat, said locking device comprising a shaft journaled in said member and having an offset locking arm at one end adapted to enter registering openings in the said interfitting members, a spring for urging said rod in a direction to maintain the arm interlocked with said openings, and a radially disposed handle on the end of the rod for manipulating the same.

In testimony whereof I have affixed my signature hereto this 11th day of February, 1930.

GEORGE EDWARD BOVINGDON.